United States Patent [19]

Laudus

[11] Patent Number: 4,757,405
[45] Date of Patent: Jul. 12, 1988

[54] MAGNETIC-TAPE APPARATUS WITH FULL AND PARTIAL HEAD PLATE ADVANCE

[75] Inventor: Joseph G. Laudus, Hasselt, Belgium

[73] Assignee: U.S. Philips Corporation, New York, N.Y.

[21] Appl. No.: 885,350

[22] Filed: Jul. 14, 1986

[30] Foreign Application Priority Data

Jul. 17, 1985 [NL] Netherlands ............... 8502055

[51] Int. Cl.$^4$ .................. G11B 5/54; G11B 21/22
[52] U.S. Cl. ......................... 360/105; 360/96.3
[58] Field of Search ............... 360/105, 106, 90, 93, 360/96.1, 96.3, 137; 242/198–201

[56] References Cited

U.S. PATENT DOCUMENTS

| | | | |
|---|---|---|---|
| 4,328,520 | 5/1982 | Iwata et al. | 360/105 |
| 4,527,210 | 7/1985 | Takamatsu | 360/105 |
| 4,547,823 | 10/1985 | Ri et al. | 360/105 |
| 4,564,873 | 1/1986 | Hashimoto et al. | 360/96.3 |
| 4,660,109 | 4/1987 | Aldenhoven | 360/96.3 |
| 4,665,451 | 5/1987 | Aldenhoven | 360/90 |

Primary Examiner—Stuart N. Hecker
Assistant Examiner—David J. Severin
Attorney, Agent, or Firm—David R. Treacy

[57] ABSTRACT

A magnetic tape apparatus comprises a head-mounting plate (6) which is movable towards two winding spindles (2, 3), which are arranged in line with each other, from a retracted position to a first position defined by a stationary stop. the winding spindles (2, 3) each carry coaxial winding idlers (4, 5) at their lower end portions, between which winding idlers (4, 5) a pivotable idler wheel (27) is arranged, which pivotable idler wheel can be driven in two opposite directions and is carried by a pivotal arm (25). After the pivotal movement the pivotable idler wheel (25) is engageable with the respective winding idler (4, 5). The pivotal arm (25) carries a sliding element (25a) on which a stop projection (25b) is arranged, which sliding element (25a) is guided on the pivotal arm for radial movement relative to the pivotal axis (17c) of the pivotal arm (25). The stop projection (25b) extends into a pivoting space which is bounded on two opposite sides by raised edges of the head-mounting plate (6). In each of these edges at least one recess (30a, 30b) is formed. By moving the head-mounting plate (6) towards the winding spindles (2, 3) the stop projection (25b) is engageable with the recess (30b) after a pivotal movement towards the pivotal axis (17c) against the force of a spring (25b) from a non-shifted first position to a second position in which it is shifted relative to the pivotal arm (25), in which last-mentioned position the stop projection (25b) occupies a stop position for positioning the head-mounting plate (6) in a second position situated between the retracted position and the first position.

8 Claims, 10 Drawing Sheets

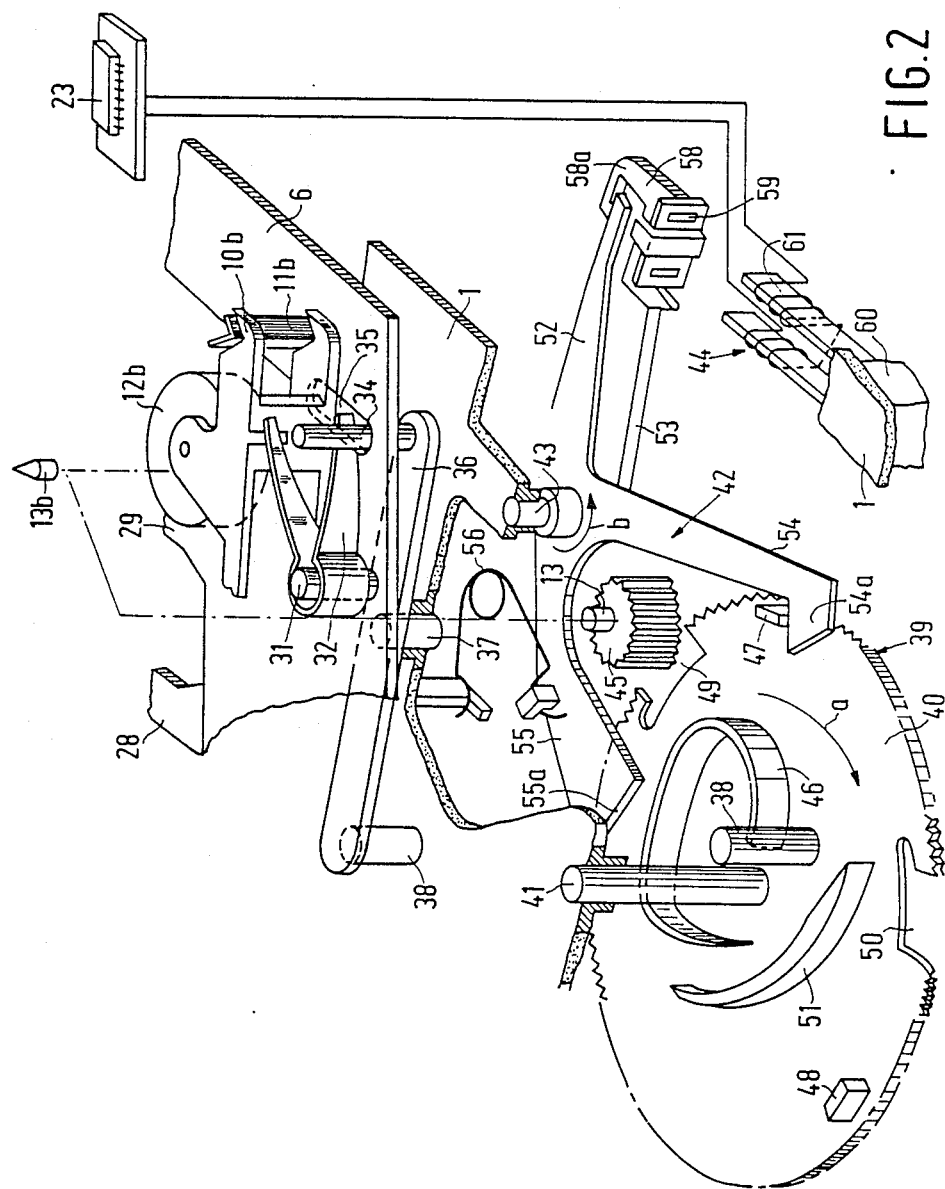

MAGNETIC-TAPE APPARATUS WITH FULL AND PARTIAL HEAD PLATE ADVANCE

BACKGROUND OF THE INVENTION

The invention relates to a magnetic-tape apparatus comprising ahead-mounting plate which is movable from a retracted position towards two winding spindles, which are arranged in line with each other, and which at their lower end portions are each connected to a coaxial winding idler. A pivotable idler wheel is arranged, between the winding idlers and can be driven in two opposite directions. This idler wheel is carried by a pivotal arm, and can be coupled to the respective winding idler after a pivotal movement. The pivotal arm carries a stop projection above which is situated the pivotable idler wheel, and extends into a pivoting space which is bounded on opposite sides by raised edges of the head-mounting plates. These edges are each formed with at least one recess which opens into the pivotal space and which is engageable by the stop projection after a pivotal movement of the pivotal arm into a pivoted stop position. The head mounting plate is movable to a first, fully advanced position defined by a stationary stop; or, when the arm moved to the stop position the stop projection positions the head-mounting plate in a second, partially advanced position situated between the retracted position and the first position.

An apparatus of this type is known from Netherlands Patent Application No. 8304313 to which co-pending U.S. Pat. No. 4,660,109 corresponds. In such an apparatus the head-mounting plate is moved from the retracted position to the first position in order to transport the magnetic tape at the normal recording or playback speed along a magnetic head arranged on the head-mounting plate. In the second position the head-mounting plate is in a slightly retracted position relative to the first position of the head-mounting plate, to ensure that the magnetic head is clear of the magnetic tape during fast winding of this tape. Viewed parallel to the direction of movement of the head-mounting plate the stop projection on the pivotal arm should have a specific minimum dimension in order to ensure that it has the required mechanical strength. This dimension of the stop projection, and hence the corresponding dimension of the recess, determine the minimum distance between the first position and the second position of the head-mounting plate. In the known apparatus the second position of the head mounting plate therefore cannot be situated too close to the first position. This may be a disadvantage if, for example the magnetic head should have some contact with the magnetic tape when a search system used during fast winding is employed. Further, the second position should be situated at a specific minimum distance from the retracted position in order to ensure that during the movement of the head-mounting plate from the retracted position to the second position enough time is available for pivoting the pivotable idler wheel to the position in which it is coupled to the respective winding idler. The total distance between the retracted position and the first position of the head-mounting plate, which is dictated by the sum of distance between the rest position and the second position and the distance between the second position and the first position, is therefore also influenced by the distance between the first position and the second position. In view of a compact construction of the apparatus it may be desirable to limit this total distance, but in the known apparatus the necessary minimum distance between the first position and the second position may then present a problem.

SUMMARY OF THE INVENTION

It is the object of the invention to reduce the distance between the first position and the second position of the head-mounting plate in a magnetic-tape apparatus of the type defined in the opening paragraph without a consequent reduction in the mechanical strength of the stop projection.

To this end the invention is characterized in that the pivotal arm carries a sliding element on which the stop projection is arranged, which sliding element is guided on the pivotal arm for radial movement relative to the pivotal axis of the pivotal arm, and a spring is arranged between the pivotal arm and the sliding element in such a way that by moving the head-mounting plate towards the winding spindles the stop projection, after it has engaged the recess, can move towards the pivotal axis from nonshifted first position to a second position, in which it is shifted relative to the pivotal arm, against the force exerted by the spring, in which last-mentioned position the stop projection occupies the stop position for positioning the head-mounting plate in the second position.

During the movement of the head-mounting plate to the second position the head-mounting plate in the apparatus in accordance with the invention moves the stop projection to the shifted second position. In this way, the stop projection enables the head-mounting plate to be moved slightly further after engagement of the stop projection in the recess and the pivotable idler wheel with the winding idler. The result of this is that the second position can be situated comparatively close to the first position, which is advantageous for limiting the total travel of the head-mounting plate between the retracted position and the first position, thereby enabling the dimensions of the apparatus to be reduced. Another advantage is that in view of the small distance over which the head-mounting plate is moved back, the magnetic head can also be used for a "search system" in the second position. In this respect it is essential that these advantages are obtained without a reduction of the mechanical strength of the stop projection and parts of the head-mounting plate. It is to be noted that where reference is made to one recess this is to be understood to mean one of the two recesses which are engageable by the stop projection depending on the direction of the pivotal movement.

A preferred embodiment of the invention is characterized in that the sliding element is formed with a slot by means of which the sliding member is guided about the pivotal axis and whose axial end walls position the latching projection in the first position or the second position, the axis of rotation of the pivotable idler wheel in the first position coinciding substantially with the axis of the stop projection, which is constructed as a cylindrical pin. As a result of the slot the sliding element can perform a correct sliding movement in a radial direction relative to the pivotal axis of the pivotal arm. Since the axial end walls of the slot function as stops a correct positioning of the sliding element in the first position and the second position is ensured. It is then essential that in the first position the stop projection is substantially coaxial with the pivotable idler wheel, so that this idler wheel can readily mesh with the respective winding idler.

In this respect a preferred embodiment of the invention is characterized in that the sliding element has an elongate shape and extends over substantially the entire length of the pivotal arm, the sliding element comprising a bifurcate portion at that end of the slot which is remote from the stop projection, the limbs of said bifurcate portion constituting additional guide means for guiding the sliding element on the pivotal arm. Thus, in conjunction with the slot the bifurcate portion guarantees an accurate guidance of the sliding movement of the sliding element.

Another preferred embodiment of the invention is characterized in that two recesses are formed in each raised edge of the head-mounting plate, which recesses open into the pivoting space, the stop projection being in the non-shifted first position after engagement with a first recess and the head-mounting plate being positioned in the first position by the stationary stop, whilst after engagement with a second recess the stop projection is in the sto position and the head-mounting plate is positioned in the second position by the stop projection. Forming two recesses in each of the two raised edges of the head-mounting plate ensures that both in the first position and in the second position of the head-mounting plate there is enough room for the stop projection to be pivoted and to couple the pivotable idler wheel to the respective winding idler. In the case of two adjacent recesses the portions situated between the two recesses should have sufficient strength and should therefore have a corresponding dimension viewed in the direction of movement of the head-mounting plate. This is not a disadvantage because the construction in accordance with the invention enables the strop projection to be shifted relative to the pivotal arm.

A magnetic tape apparatus embodying the invention will now be described in more detail , by way of example, with reference to the accompanying drawings. In the drawings:

FIGS. 1A, B are exploded views of a first part and a second part of a magnetic-tape apparatus in accordance with the invention, which parts together constitute the entire apparatus.

FIG. 2 is an enlarged-scale exploded view of the head-mounting plate and the associated servo device of the magnetic tape apparatus shown in FIG. 1, FIG. 3 is a schematic plane view showing the servo device of FIG. 2 in a first rest position, FIG. 4 is aschematic plan view showing the servo device in the first rest position of FIG. 3, together with a part of the head-mounting plate and a brake member, FIG. 5 is a schematic plan view showing the servo device of FIG. 2 in a second rest position, FIG. 6 is a schematic plan view showing a part of the head-mounting plate, which is in an advanced first position, and the actuating member which cooperates with this plate, FIG. 7 is an exploded view to a different scale, showing a part of the apparatus which is relevant to the present invention and which comprises the first and the second switching device, FIG. 8 is a schematic plan view of the first switching device during the movement of the servo member from the first position to the second position, FIG. 9 is an exploded view of a part of the first switching device during switching of the first apparatus function, FIG. 10 is a schematic plan view of a part of the apparatus during actuation of the second switching device, FIG. 11 is an exploded view of parts of the apparatus during actuation of the second switching device, FIGS. 12A, B and C are plan views showing a part of the apparatus in three different positions of the head-mounting plate.

DESCRIPTION OF THE PREFERRED EMBODIMENT

Figure 1A:
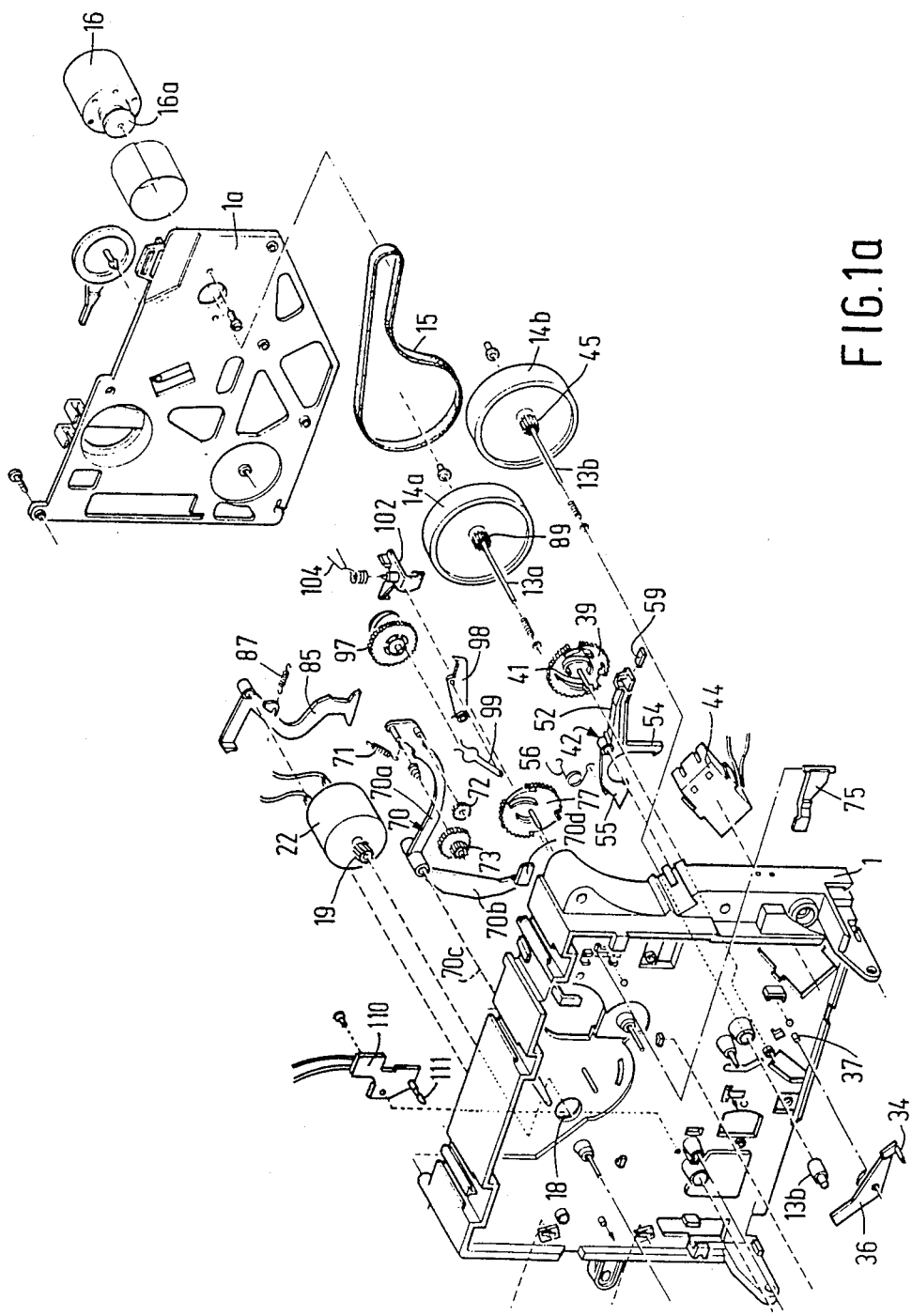

The magnetic tape apparatus shown in FIG. 1 comprises a frame 1 to which at the underside a deck plate 1a is secured by means of screws. The frame 1 carries two adjacent journals 2a and 3a on which the winding spindles 2 and 3 respectively are mounted for rotation. The lower end portions of the winding spindles each carry a coaxial circumferentially toothed winding idler 4 and 5 respectively. A friction spring 4a and 5a respectively acts against the underside of each winding idler. The function of the friction spring is, if for example the idler 5 is driven, to provide some counter-friction for the winding spindle 2, so that during winding the magnetic tape is kept sufficiently taut at the side of this spindle 2. A head-mounting plate 6 is guided on the deck 1 for rectilinear movement in directions indicated by the double arrow 7. In a manner to be described hereinafter, the head-mounting plate 6 can occupy a retracted position relative to the winding spindles and a magnetic tape cassette, not shown, on these spindles, and from this position the head-mounting plate can be moved to a first or a second advanced position, the distance of the head mounting plate from the winding spindles 2 and 3 being smaller in the first advanced position than in the second advanced position. The head-mounting plate 6 carries a rotatably mounted head system 8 comprising a combined recording/playback head 9a and an erase head 9b. Further, the head-mounting plate 6 carries two pressure-roller levers 10a, 10b which are mounted so as to be pivotable about V-shaped knife-edge fulcrums 11a, 11b secured to the upper side of the head-mounting plate 6. At the end portions which are remote from the knife-edge fulcrums 11b the pressure-roller levers 10a, 10b carry a pressure roller 12a and 12b respectively. The head-mounting plate 6 further carries two pins 31a and 31b. A first arm of a two-armed pressure spring 32a and 32b respectively, which is constructed as a blade spring and which is secured to the pin 31a, 31b, is urged against each pressure-roller lever. The other arm of the pressure spring 32a or 32b acts against an upright wall of the head-mounting plate in the rest position of this plate. The head-mounting plate 6 carries a slide 33 against which a pin 92a or 92b on the underside of the pressure-roller lever is urged by the pressure spring 32a and which slide, in a manner to be described hereinafter, controls the pivotal movement of the pressure-roller lever 10a or 10b about the fulcrums 11a and 11b respectively by a sliding movement in a direction perpendicular to that indicated by the arrow 7 (see FIG. 7). Thus, in the first advanced position of the head-mounting plate 6 the pressure roller 12a or the pressure roller 12b is urged against the capstan 13a and 13b respectively, depending on the position of the slide 33. In the second, less advanced position of the head-mounting plate the two pressure rollers 12a, b are clear of the capstans 13a, b.

Each capstan 13a, b is journalled in the frame 1 and underneath this frame it is rigidly connected to a flywheel 14a, 14b which is journalled in the deck plate 1a. A belt 15 around a pulley 16a of a first drive motor 16 is also passed around the circumference of the flywheels 14a, 14b. In this way, as is shown in FIG. 1, the flywheels are driven in opposite directions by the motor 16 via the belt 15, so that the capstans 13a and b also rotate in opposite directions.

Figure 11:
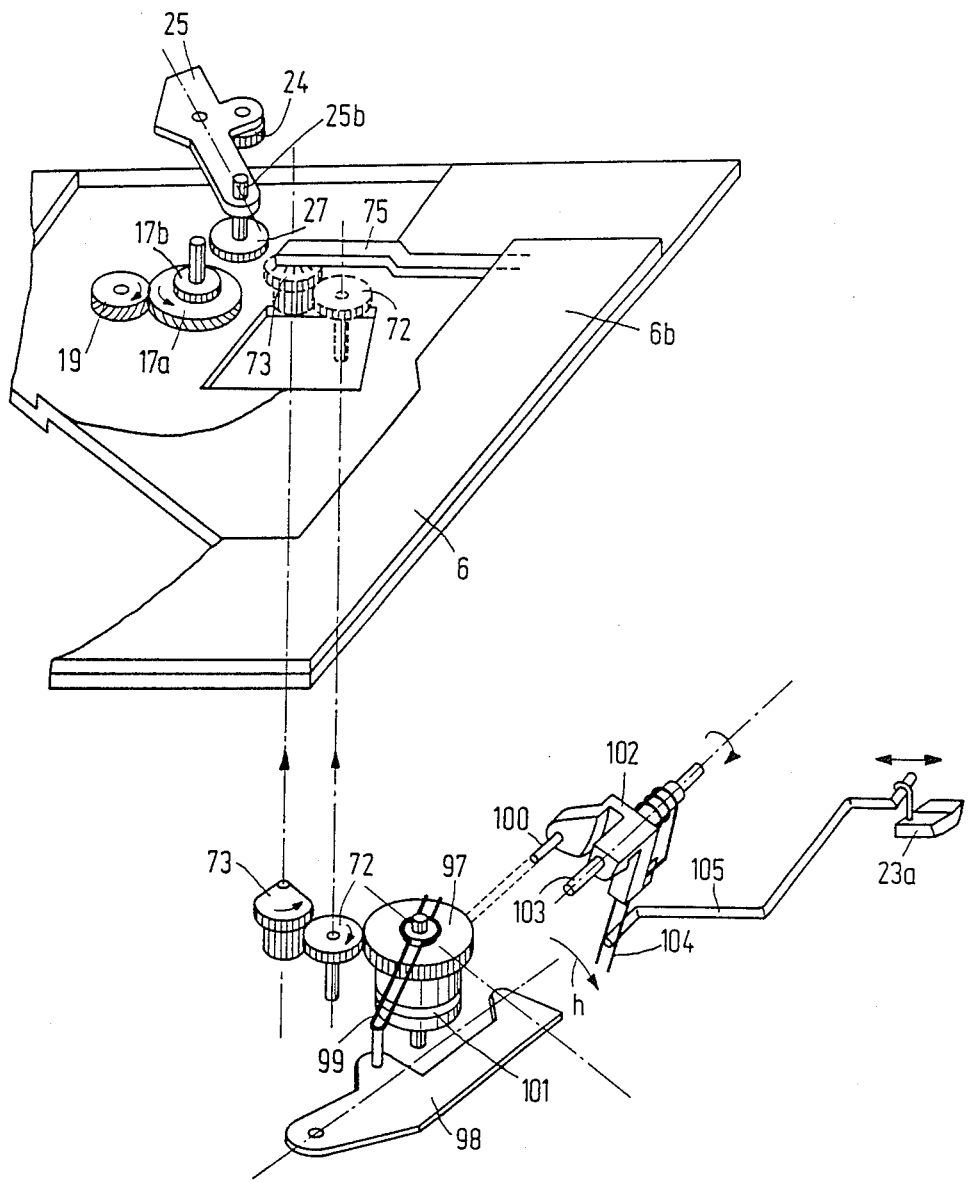

Above the deck 1 in the space between the winding idlers 4 and 5 a compound drive gear 17 is arranged. This gear comprises a comparatively large spur gear 17a and comparatively small pinion 17b. Further, a comparatively small gear wheel 19, which is rigidly connected to the shaft of the second drive motor 22, extends through an opening 18 in the frame 1. This motor is the winding motor of the magnetic-tape apparatus. The motors 22 and 16 are electrically connected to a microprocessor circuit 23 in a manner not shown (see FIG. 2) by means of which circuit the two motors can be switched on and off and the direction of rotation of the motor 22 can be reversed. Further, the microprocessor circuit 23 can switch the motor 22 to operate at a first voltage or a second voltage level, the motor producing a comparatively large driving torque at the first higher voltage and a comparatively small driving torque at a second lower voltage. Further, the microprocessor circuit is electrically connected to an impulse relay 44 via an electrical switch 20, which detects the position of the head-mounting plate 6 by means of a tab 6c, on the plate 6 to a switch 21, which detects the position of the head system 8 and the pressure rollers 12a, 12b, and to a switch 23a (see FIG. 11), which can set the apparatus to the recording mode and which, in a manner to be described hereinafter, is actuated after actuation of a "record" button, not shown.

Movement-limiting Mechanism

Figure 12A:
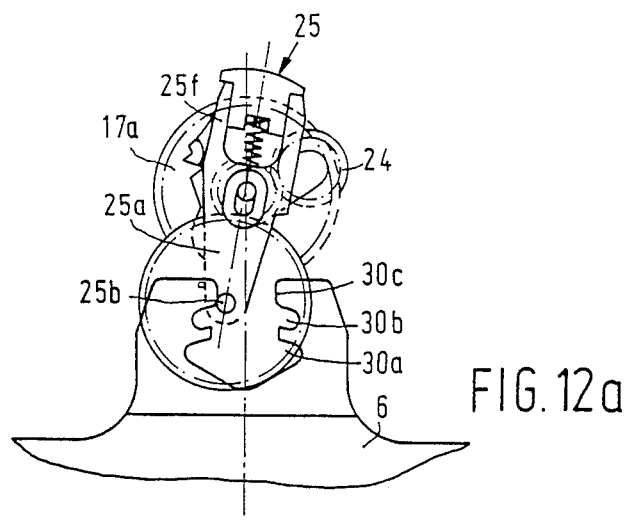
Figure 12B:
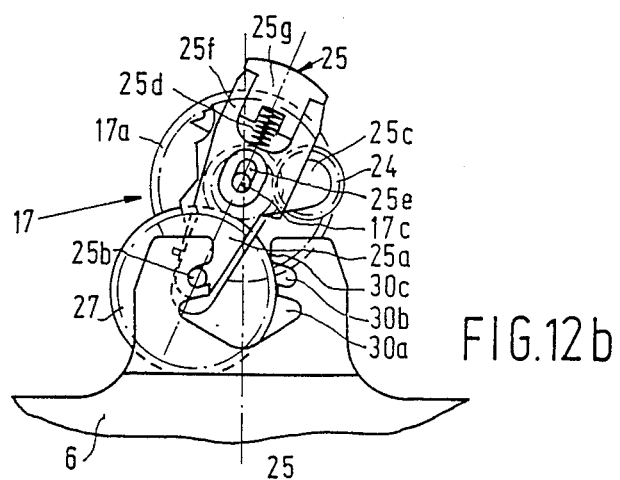
Figure 12C:
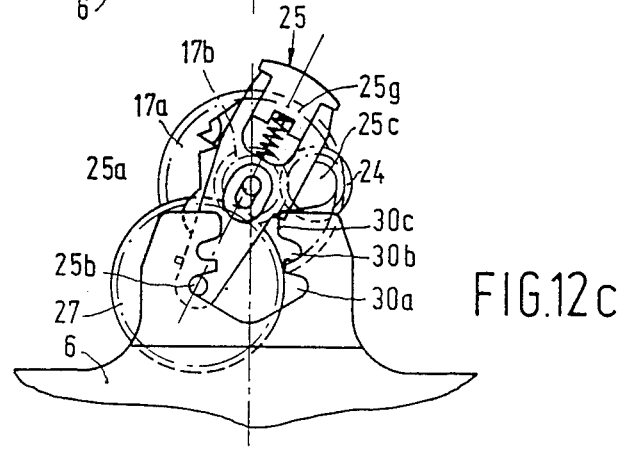

A pivotal arm 25 is pivotable about the axis 17c of the compound drive gear 17 and its free end portion which is remote from said axis carries bearing means for a comparatively large toothed idler gear 27. The pivotal arm 25 further comprises a lateral projection 25c which carries a comparatively small gear 24 (see also FIG. 12). The idler gear 27 and the gear wheel 24 both mesh with the comparatively small pinion 17b. In a manner to be described hereinafter the idler gear 27 can mesh with the winding idler 4 or the winding idler 5 after the pivotal movement of the pivotal arm 25, and thereby enable the drive motor 22 to drive either the winding spindle 2 or the winding spindle 3. In a manner, not shown, the pivotal arm 25 is connected to a friction spring 26 having a free end which presses against the large idler gear 27. At the instant at which direction the direction of rotation of the drive motor 22 is reversed, controls the spring 26 the pivotal movement of the arm 25 about the axis 17c as a result of the friction torque exerted on the idler gear 27. Thus, by pivoting the pivotal arm the idler wheel 27 can be coupled to the winding idler 4 or 5. When the winding spindle 2 or 3 is driven, winding is possible either at a comparatively low speed during recording and playback or at a comparatively high speed during fast winding. This is achieved by switching the motor 22 to operate at a lower or a higher voltage to produce a comparatively low or a comparatively high motor torque respectively As shown in FIGS. 1 and 12, the pivotal arm 25 carries an elongate sliding element 25a which is radially slidable relative to the axis 17c between a first non-shifted position and a second shifted position. To guide it, the sliding element 25a is formed with a slot 25e through which the axis 17c extends and at a first free end it comprises a bifurcate portion 25f whose limbs extend on opposite sides of a guide projection 25g on the pivotal arm 25. Consequently, the sliding element 25a follows the pivotal movements of the pivotal arm 25. At the opposite, second free end, remote from the axis 17c, the sliding element 25a carries a stop projection 25b which is disposed substantially coaxially with the idler wheel 27 if the sliding element 25a is in its first position. The sliding element 25a can be slid from the first position to the second position against the action of a pressure spring 25d. This sliding movement happens in the second slightly advanced position of the head mounting plate 6. The pressure spring 25d is situated between the central portion of the bifurcate portion 25f and the guide projection 25g on the pivotal arm 25.

Figure 1B:
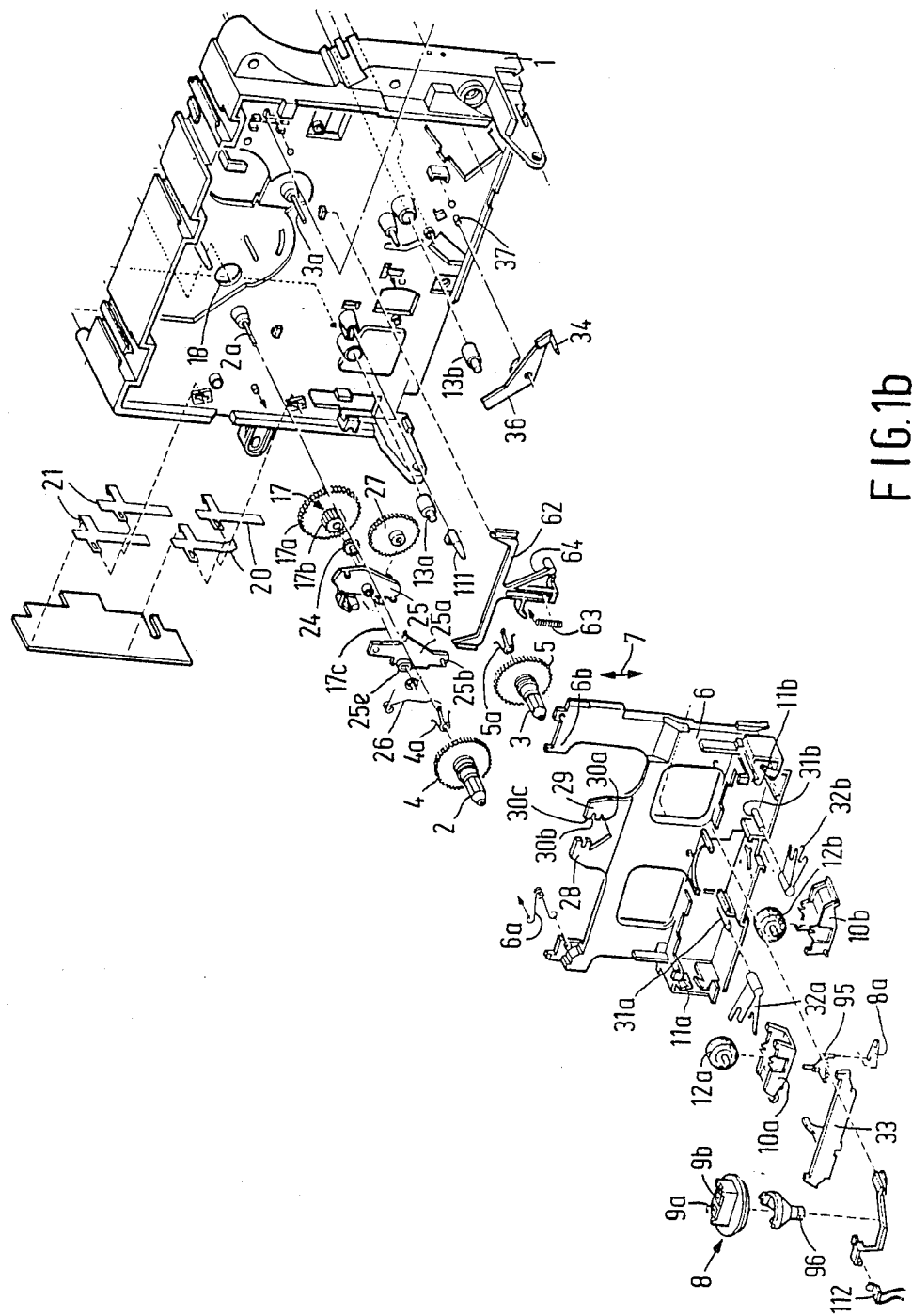

Two mutually parallel limbs 28 and 29, shown in FIG. 1b, project from the head-mounting plate 6 and are constructed and arranged mirror symmetrically relative to a plane perpendicular to the deck 1 and parallel to the arrow 7. Therefore, the description of the limb 29 also applies to the limb 28. The limb 29 extends from the head-mounting plate 6 towards a free end, and has a raised edge portion with a first recess 30a and a second recess 30b. These recesses open into the pivoting space for the stop projection 25b between the limbs 28 and 29. If the motor 22 is started before the head-mounting plate 6 is moved towards the winding spindles 2 and 3, the stop projection 25b is pivoted into the space between the limbs 28 and 29 and is consequently pressed against a stop edge 30c. As is shown in FIG. 12a, the large idler gear 27 cannot mesh with the winding idler 4 or 5 in this position of the stop projection 26 against the edge 30c. Thus, the two stop edges 30c constitute first positioning means of the head-mounting plate which position the idler wheel 27 into an inoperative position.

In a manner to be described hereinafter, the drive motor 22 can thus perform two further functions. If the head-mounting plate is advanced after the motor 22 has been switched to operate at a low voltage, the stop projection 25b will enter the second recess 30b from the pivoting space and the sliding element 25a will be moved to the second position by the head-mounting plate 6, so that the stop projection 25b occupies a stop position and the head-mounting plate 6 is moved into the second advanced position (see FIG. 12b). In this position the idler wheel 27 can mesh with the winding idler 4 or 5 after which fast winding is possible because the motor voltage applied in the motor 22 is increased.

However, if the head-mounting plate 6 is advanced before the motor 22 is started, the stop projection 25b does not obstruct the movement of the head-mounting plate and this plate can be moved to the first fully advanced position. A spring 6a then ensures that the head-mounting plate is positioned correctly in the first position and abuts against a stop, not shown, on the deck plate, thereby causing one of the pressure rollers 12a, 12b to be urged against the associated capstan 13a, 13b. After starting of the motor 22 the stop projection 25b now moves from the pivoting space into the first recess 30a and the large idler gear 27 can mesh with the winding idler 4 or 5 to drive the respective winding spindle. As already stated, the motor 22 is now operated at a lower voltage which is high enough to obtain tape transport. In this respect it is an advantage that after the stop projection 25b has engaged the recess 30b and the idler wheel 27 has meshed with the winding idler 4 or 5 the head-mounting plate is moved slightly further. As a result of this, the second position of the head-mounting plate 6 can be situated comparatively close to the first position, which enables the total travel of the head-mounting plate 6 between the retracted position and the first position to be limited and, consequently, the dimensions of the apparatus to be minimized. Another advantage is that in view of the small distance over which the head-mounting plate 6 is retracted the magnetic head 9a can also be used for a "search system" in the second position to scan the tape during fast winding. These advantages are obtained without the mechanical strength of the stop projection 25b and parts of the head-mounting plate 6 being reduced.

The Control Servo

In a manner as shown in FIGS. 2 a pin 34, which extends through a slot 35 in the head-mounting plate 6, presses against one of the limbs of the pressure spring 32b. The pin 34 is mounted at the free end of one arm of a two-armed actuating lever 36 which is pivotable about a pivot 37 connected to the frame 1. At the free end of the other arm the actuating lever 36 carries a pin 38 which extends through the frame 1 up to a servo device 39 which is situated underneath this deck plate and which will be described in more detail hereinafter.

Figure 3:
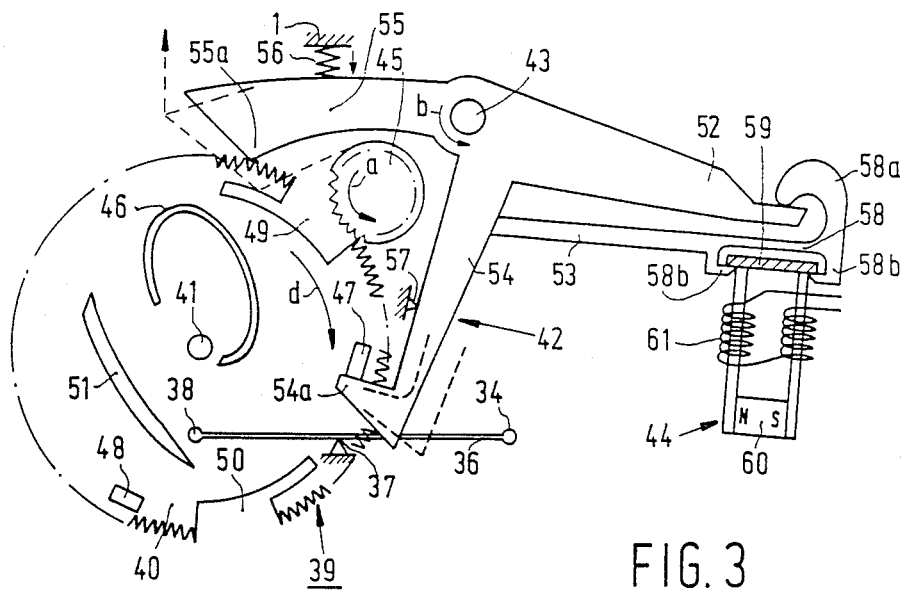

The servo device 39 comprises a partially toothed servo wheel 40 which is journalled in the frame 1 by means of a shaft 41. Further the servo device 39 comprises a servo member 42 which is pivotable about a spindle 43 mounted on the underside of the frame 1. The servo member 42 is adapted to cooperate with an impulse relay 44, which is also secured to the underside of the frame 1. The servo can be driven by a gear wheel 45, which is rigidly mounted on the shaft of the flywheel 14b and which can thus be driven by the first motor. The arrangement can cause the gear wheel to rotate in the direction indicated by the arrow a in FIG. 3. As is shown in FIG. 3 the servo wheel carries a cam 46 which is disposed eccentrically around the shaft 41 and two latching projections 47 and 48 which are spaced from each other. The servo wheel 40 is provided with circumferential teeth and has two recesses 49 and 50 in its periphery where the wheel is not toothed. In this way the servo wheel 40 can occupy a first rest position (see FIG. 5) in which the recess 49 or 50 is situated opposite the gear wheel 45 with the result that the gear wheel cannot drive the servowheel. The servowheel 40 further carries a ridge 51 which is also disposed eccentrically relative to the spindle 41. The servo member 42 comprises four arms, namely a rigid arm 52, a flexible relay-armature arm 53, a stop arm 54 and a reset arm 55. The reset arm 55 is loaded by a spring 56 whose other end is connected to the deck plate 1 and which constantly tends to pivot the servo member 42 about the spindle 43 in the direction indicated by the arrow b. The reset arm 55 comprises a reset projection 55a, which is situated at the free end of the arm 55 near the circumference of the servo wheel 40 and which comprises two converging walls forming an angle with each other. At its free end the stop arm 54 carries a stop projection 54a which is constructed as a hook. The hook has a stop wall which is disposed substantially radially relative to a circle concentric with the spindle 43 for abutment with the latching projection 47 or 48. In the rest positions shown in FIGS. 3 and 5 the latching projections 47 and 48 respectively abut the stop projection 54a, so that the servo wheel 40 is latched in the respective rest position. In this position the stop arm 54 abuts a stop 57 on the frame 1. This stop 57 defines the position of the servo member 42 in the latching position.

Figure 5:
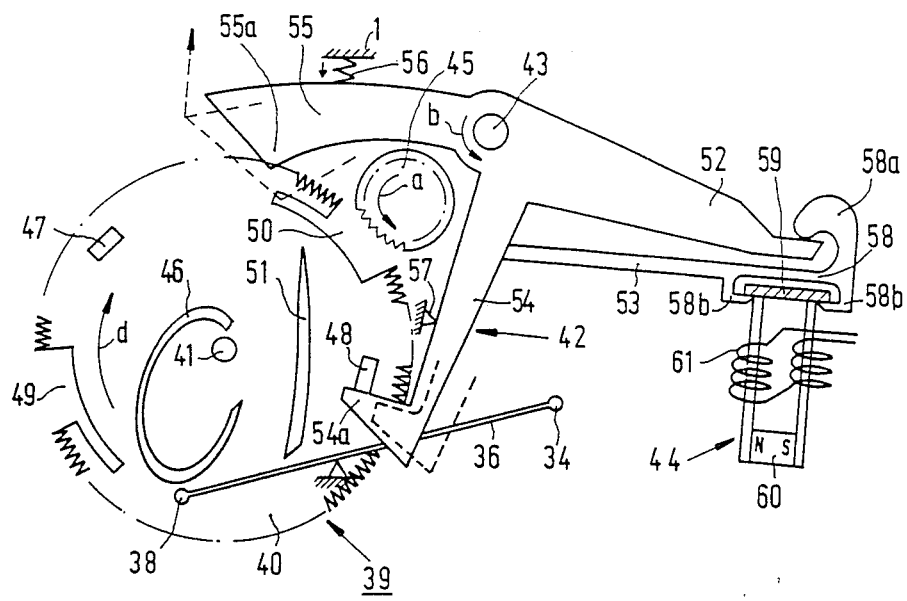

At its free end the flexible arm 53 comprises a rigid support 58, which comprises a coupling element 58a which is hook-shaped and, viewed in a direction parallel to the spindle 43, extends from the support 58 around the free end of the rigid arm 52 and, in the coupled position shown in FIG. 3, engages that side of the rigid arm 52 which is remote from the support 58. Further the support 58 comprises retaining portions 58b, which serve to retain a plate for a soft-iron armature element 59. In the latching position of the servo member as shown in FIGS. 3 and 5, the soft iron element is drawn against the impulse relay 44.

The impulse relay 44 comprises a permanent magnet 60 comprising two limbs around which two coils 61 are wound. Consequently, the relay 44 has both a permanent magnet and an electromagnet, whose coils are connected to a current source, not shown, under control of the microprocessor circuit 23. The impulse relay 44 is arranged so that when the coils 61 are not connected to the current source, the magnet 60 constantly attracts the soft iron element 59 as a result of its permanent magnetism. In the latching position the servo member 42 is kept firmly in position by means of the stop 57 and the impulse relay 44. A brief energization of the coils 61, which can be achieved by means of an electrical impulse, causes the permanent magnetism of the magnet 60 to be neutralized by the electromagnet, so that the soft iron element 59 is no longer attracted. The spring 56 then causes the servo member 42 to pivot about the spindle 43 in the direction indicated by the arrow b. By means of the coupling element 58a, when the servo member is pivoted in the direction indicated by the arrow b, the support 58 can be pivoted with the soft iron element 59 rigidly coupled to the arm 52; and, when the relay-armature member is pivoted in a direction opposite to that indicated by the arrow b, the rigid arm 52 can be pivoted slightly further after the soft iron element 59 has been attracted by the magnet 60. This is possible due to the elastic flexibility of the arm 53.

Figure 4:
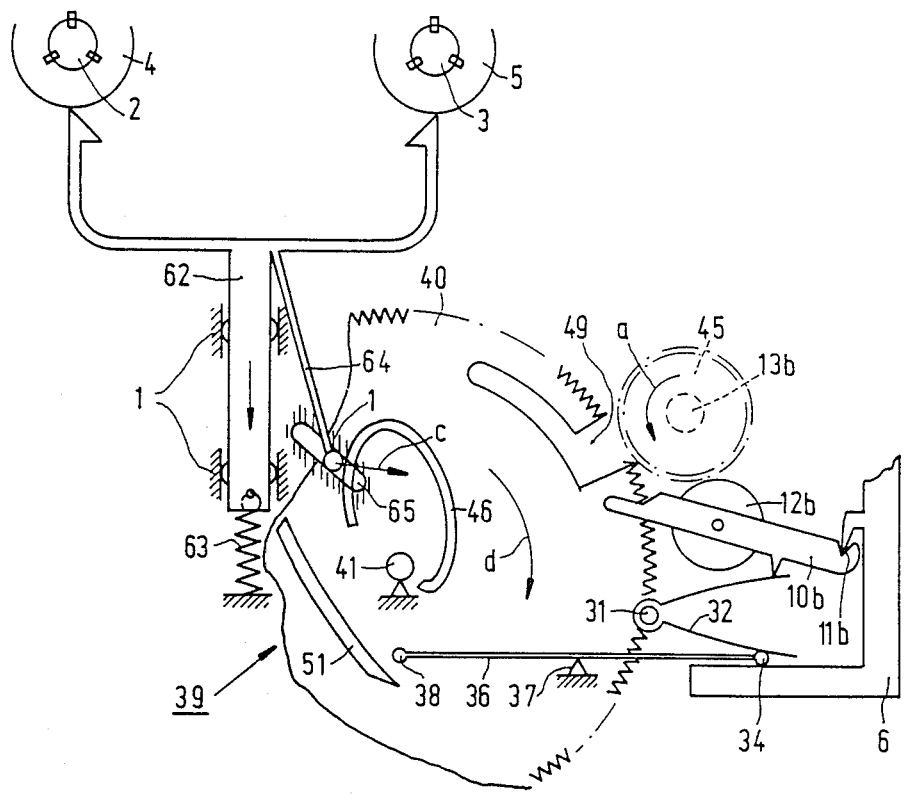

As is shown in FIGS. 1 and 4 a brake member 62 is guided in the frame 1 so as to be slidable parallel to a plane of symmetry at half the distance from the winding idlers 4 and 5. A spring 63 consequently urges the brake member 62 in a direction away from the winding idlers 4 and 5. The brake member 62 carries a projecting element 64 which is guided in a slot 65 in the frame 1. In the first rest position of the servo wheel 40 the free end of the element 64 presses against the cam 46 under the influence of the spring 63 and exerts a starting torque (arrow c) which tends to rotate the wheel 40 about the spindle 41 in the direction indicated by the arrow d. However, as long as the stop projection 54a is in engagement with the latching projection 47, this starting torque c can have no effect. However, if as a result of the pulse-wise energization of the impulse relay 44 the soft iron element 59 is no longer attracted, the servo member 42 can pivot about the spindle 43 in the direction indicated by the arrow b. In this respect it is advantageous that the servo member 42 is rigid except for the flexible arm 53, so that the friction between the stop projection 54a and the latching projection 47 can be compensated for effectively.

Figure 6:
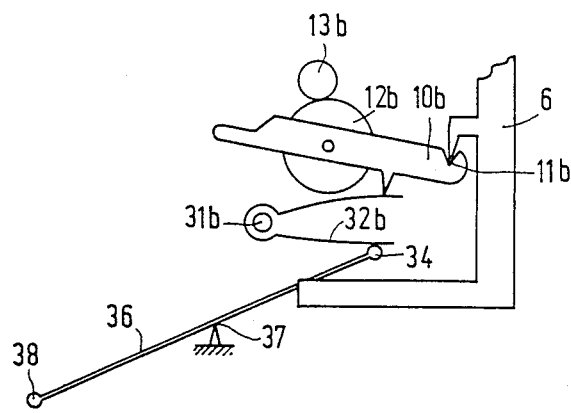

After the release of the servo wheel 40 the starting torque (arrow c) can rotate the servo wheel to bring the circumferential teeth of the servowheel into mesh with the gear wheel 45, which is driven by the motor 16, so that the servo wheel is rotated further in the direction indicated by the arrow d as a result of the rotation of the gear wheel 45 in the direction indicated by the arrow a. At the instant at which the impulse relay 44 is energized, the second motor 22 has not yet started if the first advanced position is to be occupied. If the head-mounting plate 6 is to be moved to the less advanced second position the second motor 22 should be started before the impulse relay 44 is electrically energized. During rotation of the servo wheel 40 the actuating lever 36 is moved into the position shown in FIGS. 5 and 6 by the cam 46. The lever can assume this position because the latching projection 48, as is also shown in FIG. 5, has first engaged the reset projection 55a and thereby pivotally reset the servo member 42 from the inoperative position to the latching position. Subsequently, after the final part of the rotation of the latching projection 48, this projection abuts the stop projection 54a on the servo member 42, so that the servo wheel 40 is now latched in the second rest position. In this position the recess 50 is disposed opposite the gear wheel 45, so that a further rotation of the gear 45 has no effect on the servo wheel 40.

During the pivotal movement of the actuating lever 36 by the cam 46, pressure is exerted on the spring 32b via the pin 34, so that the spring presses against the pressure-roller lever 10b. As a result of the knifeedge fulcrum 11b and the abutment of the pin 92b on the pressure-roller lever 10b against the slide 33, the head-mounting plate 6 is advanced to the first or the second advanced position, the switch 20 being closed by the projection 6c on the head-mounting plate 6 in both positions. In the first advanced position the pressure roller 12a or 12b now presses against the capstan 13a or 13b with the result that the pin 34 moves slightly further than the head-mounting plate 6, so that there is sufficient pressure on the capstan 13a or 13b via the pre-load on the spring 32b and the force of the spring 6a. This has the advantage of compensating effectively for possible tolerances in the transmission between the cam 46 and the head-mounting plate 6. From the instant at which the pressure roller 12a or 12b presses against the capstan 13a, 13b, which is detected by the switch 20, the circuit 23 signals that the motor 22 can be switched to the lower voltage and that recording or playback may commence and the tape may be wound towards the winding spindle 2 or 3 in a manner to be described hereinafter.

For detecting the end of the tape a plate 110 is secured underneath the frame 1 and carries a photocell, not shown, which is arranged near the lower end portion of a light guide 111 (see FIG. 1). The head-mounting plate 6 carries a light source 112 which emits light towards the upper end of the guide 111. As soon as the non-transparent magnetic tape has been transported up to its end the light is transmitted by the transparent leader tape which connects the magnetic tape to the reel of the magnetic-tape cassette, not shown, and the end of the magnetic tape is detected by the photocell. This cell now supplies an electric signal to the microprocessor circuit 23.

When the end of the magnetic tape is reached or if a stop button or a direction-reversal button ("direction" button) not shown, is actuated the impulse relay 44 is re-energized by the circuit 23. As a result of this, the servo member 42 is again moved from the latching position to the inoperative position, while in addition the latching projection 48 is disengaged from the stop projection 54a. In this situation the actuating lever 36 presses against the cam 46 in such a way that the pressure exerted on the actuating lever 36 by the spring 32b produces a starting torque on the cam, so that the servo wheel 40 can rotate further in the direction indicated by the arrow d and the circumferential teeth on the servo wheel can again mesh with the gear 45. As a result the servo wheel is again driven, the pin 38 being guided between the cam 46 and the ridge 51, so that the actuating lever 36 is pivoted back in a clockwise direction about the pivot 37. This results in the pin 34 pressing directly against the end wall of the slot 35 in the head-mounting plate 6 so that this plate is moved towards the retracted position in the direction indicated by the arrow 7. When the servo wheel 40 begins to rotate, the cam 46 exerts a force on the projecting element 64 of the brake member 62 such that the brake member is briefly moved towards the winding idlers 5 and 4. Consequently, during the rotation of the servo wheel 40 the brake member is actuated and the winding idlers 4 and 5 are braked. During the rotation in the direction indicated by the arrow d, the latching projection 47 cooperates with the reset projection 55a to return the servo member from the inoperative position to the latching position (see FIG. 3). Subsequently, the latching projection 47 again abuts the stop projection 54a so that the servo wheel again occupies the first rest position as shown in FIG. 3. If the stop button is pressed the head-mounting plate 6 remains in the retracted position and the motors 16 and 22 are stopped. However, if the end of the tape is detected by the photo-cell or the direction-reversal button is actuated, the head-mounting plate 6 is directly moved from the retracted position to the first position by the servo wheel 40 and tape transport is effected in the reverse direction in a manner to be described hereinafter.

For the reversal of the direction of tape transport a member 70 is mounted for pivotal movement underneath the frame 1 in a manner as shown in FIGS. 1, 7, 8 and 9. This member is constructed as a two-armed lever which is pivotable against the force of a latching spring 71. At the free end of a first arm 70a the member carries two rotatable gears comprising a coupling wheel 72 and a switching wheel 73 which is in mesh therewith. The switching wheel is urged upwards in an axial direction relative to the member 70 by a spring 74. The upward movement of the switching wheel is limited by a projection 75 which is pivotally connected to the frame 1 and which cooperates with an abutment edge, not shown, formed on the lower surface of a projecting limb 6b of the head-mounting plate 6. Thus, by moving the head-mounting plate 6 to the first or the second advanced position the switching wheel 73 can be pressed axially downwards as a result of a downward pivotal movement of the projection 75, so that the switching wheel 63 becomes disengaged from the gear wheel 24 on the pivotal arm 25. In this way the head-mounting plate 6 moves the switching wheel 73 to an inoperative position by means of the abutment edge and by means of the projection 75, which together constitute the second positioning means of the head-mounting plate. Further it is to be noted that, for the sake of clarity, the sliding element 25a shown in FIGS. 1 and 12 is omitted in FIGS. 7 and 11. These Figures show the stop projection 25b on the pivotal arm 25 but in reality the stop projection 25b is situated on the sliding element 25a, as is shown in FIGS. 1 and 12.

Figure 7:
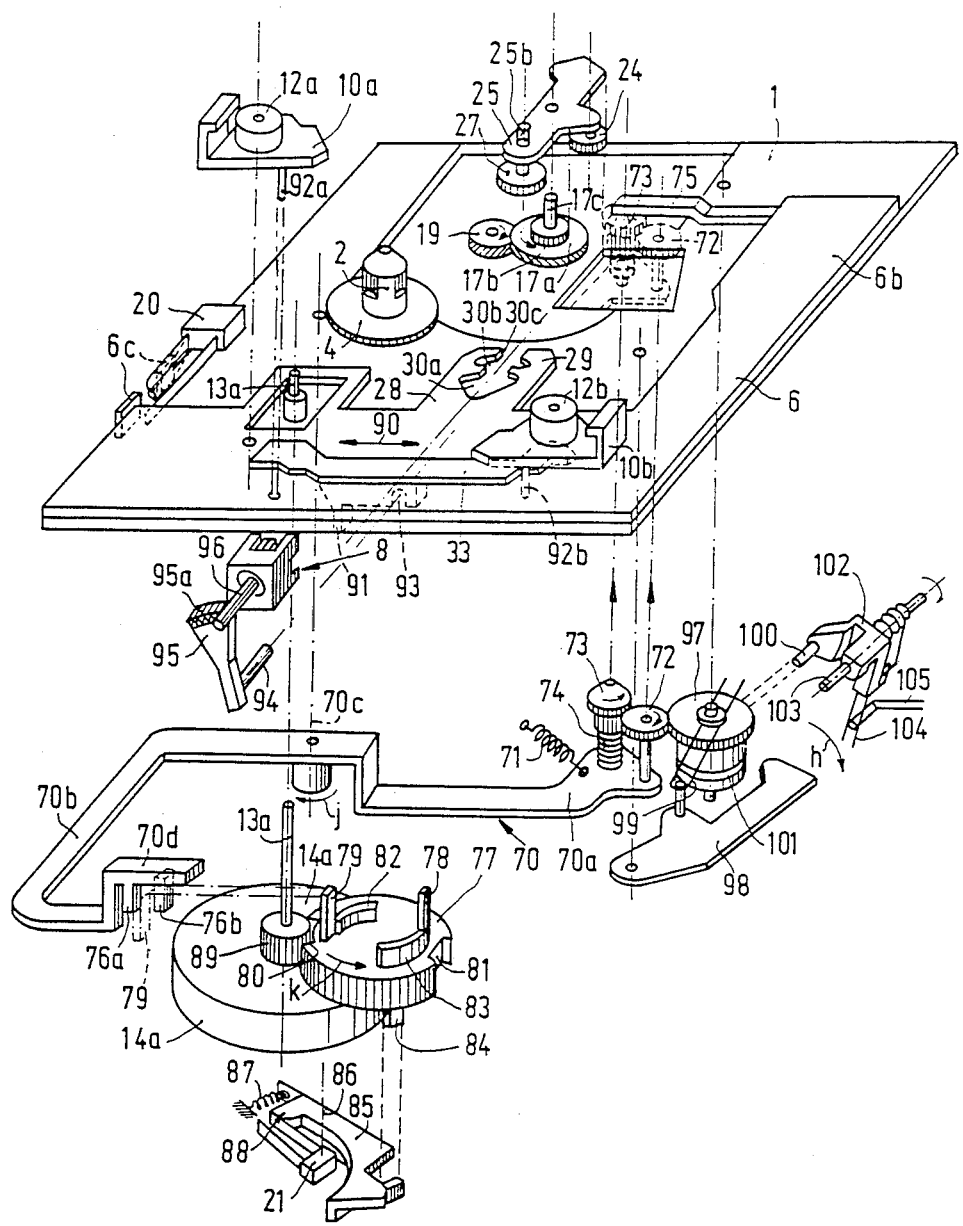

In the retracted position of the head-mounting plate 6 it is ensured that the switching wheel 73 is in mesh with the gear wheel 24 via the second positioning means. In this way the drive motor 22 can drive the coupling wheel 72 via the switching wheel 73. The member 70 comprises an arm 70a which extends almost up to the rear of the apparatus, where the arm 70a carries the coupling wheel 72 and the switching wheel 73. Substantially halfway between the rear wall and front wall of the apparatus the member 70 is mounted so as to be pivotable about a pivotal axis 70c and at this location the first arm 70a adjoins the second arm 70b. The latter arm extends almost up to the front of the apparatus and at this location it has a bent portion bearing the reference numeral 70d in FIGS. 7, 8 and 9. At the free end of the bent portion 70d two latching projections 76a and 76b are provided, which in the same way as described for the latching projection 54a can block a toothed second servo wheel 77 against rotation. For this purpose, the servo wheel 77 carries two latching projections 78 and 79 whose function may be compared to that of the latching projections 47 and 48 of the servo wheel 40. The two projections 76a and 76b are radially spaced from each other relative to the axis of rotation of the wheel 77. This is in order to preclude that, as a result of the time required for the servo member 70 to return to the latching position after actuation so that the projection 76a does not resume the latching position at the correct instant, the servo wheel would continue to rotate. This construction ensures that after 180° rotation of the wheel 77 the projection 76b, which is situated at a shorter distance from the axis of rotation of the wheel 77, initially retains the latching projection 78 or 79 and subsequently, during the return movement of the servo member 70, guides the latching projection to the stop projection 76a in a manner, not shown, to keep the wheel again in the latching position. Near each latching projection the servo wheel has a non-toothed portion 80 and 81 respectively. These non-toothed portions are similar to the portions 49 and 50 of the servo wheel 40. There are also provided two cams 82 and 83 similar to the cam 46 and the ridge 51. Further, the lower side of the servo wheel 77 also carries two starting pins 84, of which one pin is shown in FIG. 7. These starting pins are adapted to cooperate with a starting member 85 which is pivotable about an axis 86, the starting member 85 being attached to a spring 87 which tends to pivot the member about the axis 86 and which thus produces the starting torque for the servo wheel 77. Moreover, the starting member 85 comprises a projection 88 which cooperates with the contacts of the switch 21. The servo wheel 77 can cooperate with a gear wheel 89, which is rigidly connected to the flywheel 14a. As the pins 84 are disposed at different radial distances from the axis of rotation of the wheel 77 the starting member 85, in each of the two rest positions of the wheel 77, occupies a position corresponding to these rest positions, which is detected by the switch 21. Thus the switch 21 can supply a signal indicative of the position of the wheel 77 to the microprocessor circuit 23.

The underside of the slide 33, which is guided on the head-mounting plate 6 for rectilinear movement in directions indicated by the double arrow 90, carries a limb 91 which extends to a location underneath the frame 1. As a result of this, the limb 91 can be controlled by the cams 82 and 83. During contact with the cam 82 this cam presses the limb 91 to the left, as indicated by the double arrow 90 in FIG. 7, the limb 91 abutting the outer surface of the cam 82. During the cooperation with the cam 83 the limb 91 abuts the inner side of the cam 83, so that the limb 91 is moved to the right viewed in FIGS. 7 and 8.

Figure 8:
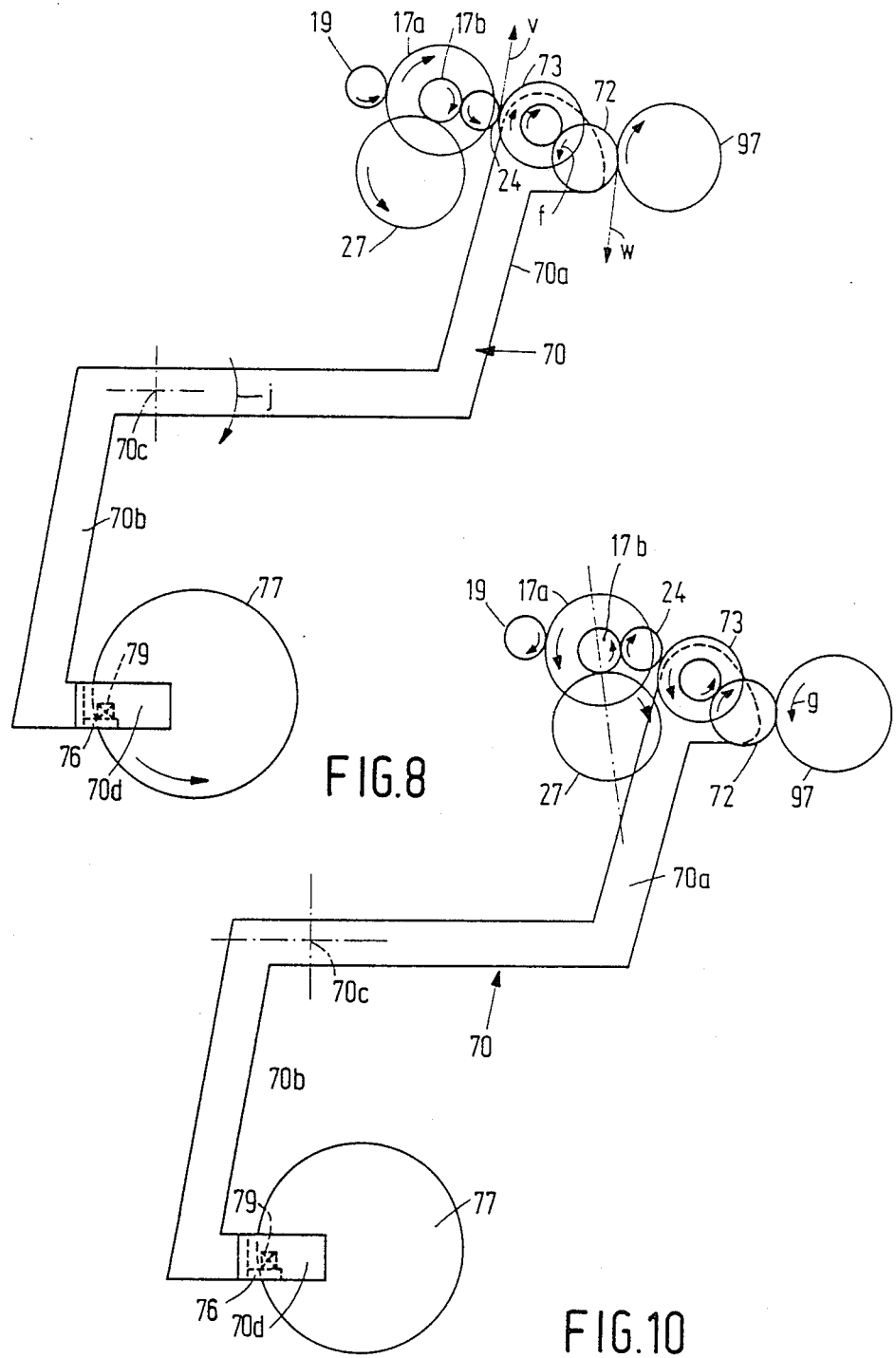
Figure 9:
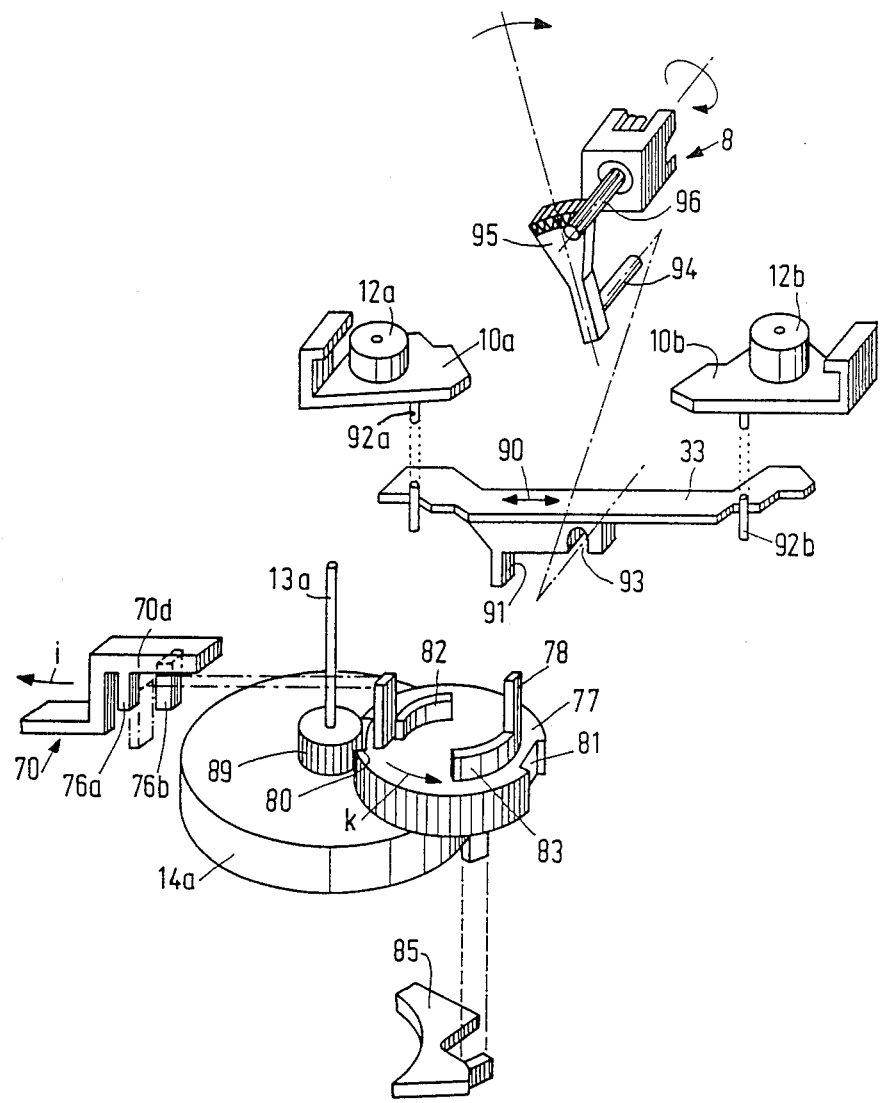

Further, the coupling wheel 72 engages a body which, as will be explained hereinafter, can at least temporarily assume a stationary position. This body comprises a third toothed servo wheel 97 which is rotatably journalled in the frame 1. The servo wheel 97 is blocked against rotation in one direction by a latching member 98 which is constituted by a pivotable lever, which ensures that the servo wheel 97 occupies a fixed position if the coupling wheel rotates in a direction as indicated by the arrow f in FIG. 8. If the coupling wheel rotates in a direction opposite to that indicated by the arrow f because the drive motor 22, which is operated at the higher voltage, drives the coupling wheel in the other direction, the servo wheel 97 will rotate in the direction indicated by the arrow g in FIG. 10, so that as a result of the friction coupling, which bears the reference numeral 99 in FIG. 11, between the servo wheel and the latching member 98, the latching member 98 is pivoted into an inoperative position in the direction indicated by the arrow h. Thus, depending on the direction of rotation of the motor 22 and depending on the voltage level, the servo wheel 97 occupies a fixed position or can rotate. If the servo wheel is in a fixed position the situation shown in FIG. 8 is obtained, in which the coupling wheel 72 exerts a force W on the member 70, which if the motor 22 is operated at the higher voltage is large enough to overcome the force V exerted by the latching spring 71, thereby causing the member 70 to be pivoted about the pivotal axis 70c in the direction indicated by the arrow j in FIG. 8. This can be achieved by an impulse-wise energization of the motor 22. In this position the latching projections 76a and 76b consequently move over the same distance in the direction indicated by the arrow j in FIG. 9 to release the latching projection 78 or 79, so that the servo wheel 77 is no longer locked. As a result of this, the starting member 85 can exert a starting torque on the servo wheel 77, so that the teeth of this wheel mesh with the teeth of the wheel 89 and the servo wheel begins to rotate in the direction indicated by the arrow k in FIG. 9. This results in the slide 33 being moved in the direction indicated by the arrow 19 via the cam 82 or 83. In the meantime the direction of rotation of the drive motor 22 has been reversed and the motor has been switched over to low-voltage operation by means of the microprocessor circuit 23. The motor 22 is again energized pulse-wise but this suffices to reset the member 70 to the latching position by means of the latching spring 71, so that the servo wheel 77 stops after a rotation of 180° when the non-toothed portion 80 or 81 is disposed opposite the gear wheel 89.

Thus, if the head-mounting plate 6 is in the retracted position the servo wheel 77 can move the slide 35 to the left or to the right in a switching mode of the apparatus. This movement results in the pins 92a and 92b on the underside of the pressure roller 10a, b being actuated, so that depending on the position of the slide 32 the pressure roller lever 10a or the pressure roller lever 10b will occupy a more advanced position on the head-mounting plate. Thus, after the movement of the slide 33 and, after the subsequent movement of the head-mounting plate 6 to the advanced position, the pressure roller 12a or the pressure roller 12b can be pressed against the associated capstan 13a or 13b. This dictates the direction of tape transport in the recording or the playback mode of the apparatus.

Further, the underside of the slide 33 is formed with a recess 93 which receives a spindle 94 with some clearance. This spindle is rigidly connected to a pivotal arm 95, whose upper side is provided with teeth 95a. The teeth 95a engage with a toothed spindle 96, which is fixedly connected to the head system 8. An over-center spring 8a, shown in FIG. 1, ensures that in each end position of the pivotal arm 95 the head system 8 is positioned correctly on the head-mounting plate 6 against a stop, not shown. As a result of the clearance of the spindle 94 in the recess 93 the spindle 94 has enough room in the end position of the slide 33 to enable the over-center spring 8a to urge the head system 8 firmly against the stop. As a result of the action of the pivotal arm 95 the head system 8 is thus also turned through 180° in opposite direction during the movement of the slide 33, so that depending on the direction of the tape transport the head system occupies the correct position for recording and/or playack. Since the positions of the pressure rollers 12a and 12b and the head system 8 are detected by the switch 21 via the slide 33, the servo wheel 77 and the starting member 85, the microprocessor circuit 23 can signal the position of the pressure rollers and the head system by means of the switch 21. After the circuit 23 has ascertained that the pressure rollers and the head system have been moved to the correct positions, the head-mounting plate 6 is moved from the retracted position to the first position via the servo device 39, which is detected by means of the switch 20. These positions enable the magnetic-tape apparatus in accordance with the invention to operate as an "auto-reverse" apparatus.

If the drive motor 22 is operated at the higher voltage and the coupling wheel 72 is then rotated in a direction opposite to that indicated by the arrow f, this results in the servo wheel 97, as already described, being disengaged from the latching member 98, so that now the servo wheel 97 is rotated. As a result of this, a pin 100 is guided in a circumferential slot 101 formed in a sleeve which is coaxially secured to the servo wheel 97 and which is shaped like a sinewave. As a result of this shape the pin 100 moves with a switching member 102 about an axis 103, the switching member 102 cooperating with limbs of an over-center spring 104. The limbs of the over-center spring 104 are positioned against a rod 105, which is connected to the recording switch 23a (see FIG. 11). Thus, the rotation of the servo wheel 97 causes the recording switch 23a to be actuated, which results in an acknowledgement signal to the microprocessor circuit 23, which subsequently switches off the motor 22. At this instant the apparatus is in the "record standby" mode and the tape transport in the desired direction can be started by actuating the "play" or "replay" button on the apparatus.

In this way it is possible to actuate both the servo wheel 77 and the servo wheel 97 by means of the motor 22, so that in the switching mode of the apparatus two different apparatus functions can be actuated by means of the motor 22 with the aid of two switching devices. It is important that the force for actuating the servo wheel 97 can be produced only if the motor 22 is operated at the higher voltage. If the motor 22 is operated at the lower voltage it cannot overcome the resistance provided by the recording switch 23a, so that when operated at the lower voltage the motor 22 cannot influence the servo wheel 97. Thus, when operated at the lower voltage the motor 22 can only drive the idler wheel 27 and hence the winding idler 4 or 5.

Herinafter a brief description is given of the switching operations effected for a specific apparatus function in the apparatus in accordance with the invention.

It is assumed that the apparatus is in the stop mode, in which all the parts are in their rest positions. Pressing any actuating button results in the drive motor 16 being started via the microprocessor circuit 23, so that the flywheels 14a, 14b begin to rotate in opposite directions. If the standby button is pressed, no further switching operation is effected; after approximately 2 minutes the motor 16 is stopped again by the microprocessor circuit 23.

If the "play" or "replay" button is depressed (which means tape transport from the winding spindle 2 to the winding spindle 3 or in the opposite direction at the low tape speed) the microprocessor circuit 23 will first check the positions of the pressure rollers 12a and 12b and the head system 8 via the switch 21. If this position corresponds to the direction associated with the relevant actuating button, the switching cycle described above is now effected, which commences with the actuation of the impulse relay 44. As a result of this, the head-mounting plate 6 is moved forward to the most advanced first position. However, if the switch 21 detects that the pressure rollers 12a and 12b and the head system 8 are not in the correct positions, the above switching cycle is effected by means of the motor 22 and the servo wheel 77 prior to the actuation of the impulse relay 44. When it is detected via the switch 21 that the slide 33 has been moved to the correct position, the head-mounting plate 6 is advanced in the manner described in the foregoing, which is detected by the switch 20. Subsequently, the motor 22 is re-energized with the lower voltage, causing it to rotate in the direction selected by pressing the relevant button "play" or "replay".

If one of the fast wind buttons "rewind" or "wind" is pressed the motor 22 is energized with the lower voltage after starting of the motor 16. The direction of rotation of the motor 22 depends on the selected actuating button. Subsequently, in the manner described in the foregoing, the head-mounting plate 6 is moved forwards by means of the actuation of the impulse relay 44, but now the head-mounting plate is blocked in the second less advanced position because the stop projection 25b now engages the recess 30b. After the closure of the switch 20 the motor 22 is switched to the higher voltage and fast tape transport in the desired direction is possible.

When the button "direction" is depressed, the motor 22 is energized with the higher voltage after starting of the motor 16. The motor 22 rotates in a direction corresponding to the direction associated with the actuating buttons "replay" and "rewind". This results in the switching cycle described above, which is effected by means of the motor 22 and the servo wheel 77. Subsequently, the motor 22 is switched off. Thus, the direction of tape transport of the magnetic-tape apparatus is reversed by pressing the "direction" button.

When the "record" button is actuated after starting of the motor 16, the motor 22 is driven in the direction corresponding to the actuation of the "play" or the "wind" button. Subsequently, the recording switch 23a is actuated via the servo wheel 97 to set the apparatus to "record standby".

It is important that the head-mounting plate can be set to three positions by means of only one impulse relay 44, the flywheel motor 16 and the winding motor 22. In the apparatus in accordance with the invention this can be achieved by means of a minimum number of electromechanical actuators.

The motor 22 can drive the winding spindle 2 or 3 for normal tape transport or for rapid tape transport in two opposite directions. Further, it is advantageous that the motor 22 can actuate two apparatus functions, namely the reversal of the direction of tape transport, by switching over the pressure rollers 12a and 12b and turning of the head system 8, and the changeover of the recording function, for which the recording switch 23a is actuated. The two last-mentioned apparatus functions are each started by briefly energizing the motor 22 with the higher voltage. Alternatively, this pulsewise energization of the motor 22 enables other apparatus functions to be switched by means of the motor 22. For example, instead of by means of the impulse relay 44 the head-mounting plate 6 can be switched by means of the motor 22. It is alternatively possible to switch only one apparatus function with the motor 22. This may be the reversal of the direction of tape transport or the changeover of the recording switch. The first possibility is obtained if the microprocessor circuit 23 starts the recording process fully electronically. The second possibility is advantageous if the apparatus is constructed in such a way that it operates in only one direction of tape transport during recording and playback.

What is claimed is

1. A magnetic-tape apparatus, comprising
a head mounting plate having two raised edges bounding respective opposite sides of a pivoting space, each of said edges having at least one recess formed therein, opening into said pivoting space,
two winding spindles arranged in line with each other, and a winding idler drivingly connected to each of said spindles,
a pivotal arm carrying a pivotal idler wheel for driving a selected one of said spindles in a respective one of two opposite directions, and means for pivoting said arm about a pivotal axis for operable engagement of said idler wheel with the respective winding idler,
a stop projection carried on said pivotal arm, extending into said pivoting space, for engaging one of said recesses after pivotal movement of the arm into a pivoted stop position,
means for moving said mounting plate from a retracted position to a first position defined by a stationary stop; and in response to movement of the pivotal arm into the pivoted stop position, moving said mounting plate from said retracted position to a second position situated between the retracted position and the first position, said stop projection defining said second position,
characterized in that said pivotal arm comprises a sliding element on which said stop projection is arranged,
means for guiding said sliding element on the pivotal arm for radial movement relative to a pivotal axis of the arm, and a spring biassing said sliding element such that, upon movement of the head mounting plate toward the winding spindles, after said stop projection has engaged said recess, the stop projection can be moved toward said pivotal axis from a non-shifted first position to a second position in which the sliding element is shifted relative to the pivotal arm against the spring force, in said second position the stop projection positioning the head mounting plate in the mounting plate second position.

2. An apparatus as claimed in claim 1, characterized in that said raised edges each have two recesses formed therein, opening into said pivoting space, in the non-shifted first position said stop projection engaging a first recess, and the head mounting plate being positioned in said first position by said stationary stop, and
upon engagement with a second recess said stop projection being in the stop position, and said head mounting plate being positioned in the second position by the step projection.

3. An apparatus as claimed in claim 1, characterized in that said sliding element has a slot for guiding the sliding member relative to the pivotal axis, and axial end walls for positioning the latching projection in the first or the second position,
said stop projection being a cylindrical pin having an axis substantially coincident with an axis of rotation of the pivotal idler wheel.

4. An apparatus as claimed in claim 3, characterized in that said raised edges each have two recesses formed therein, opening into said pivoting space, in the non-shifted first position said stop projection engaging a first recess, and the head mounting plate being positioned in said first position by said stationary stop, and
upon engagement with a second recess said stop projection being in the stop position, and said head mounting plate being positioned in the second position by the stop projection.

5. An apparatus as claimed in claim 3, characterized in that the sliding element is an elongate element extending substantially the entire length of the pivotal arm, and comprises a bifurcate portion at a slot end remote from the stop projection, said bifurcate portion having limbs which constitute additional guide means for guiding the sliding element on the pivotal arm.

6. An apparatus as claimed in claim 5, characterized in that said raised edges each have two recesses formed therein, opening into said pivoting space, in the non-shifted first position said stop projection engaging a first recess, and the head mounting plate being positioned in said first position by said stationary stop, and
upon engagement with a second recess said stop projection being in the stop position, and said head mounting plate being positioned in the second position by the stop projection.

7. An aparatus as claimed in claim 5, characterized in that said spring is a compression spring disposed between said pivotal arm and a junction of said limbs.

8. An aparatus as claimed in claim 7, characterized in that said raised edges each have two recesses formed therein, opening into said pivoting space, in the non-shifted first position said stop projection engaging a first recess, and the head mounting plate being positioned in said first position by said stationary stop, and
upon engagement with a second recess said stop projection being in the stop position, and said head mounting plate being positioned in the second position by the step projection.

* * * * *

UNITED STATES PATENT AND TRADEMARK OFFICE
CERTIFICATE OF CORRECTION

PATENT NO. : 4,757,405
DATED : July 12, 1988
INVENTOR(S) : JOSEPH G. LAUDUS

It is certified that error appears in the above-identified patent and that said Letters Patent is hereby corrected as shown below:

Claim 2, line 10: Change "step" to -- stop --

Claim 8, line 10: Change "step" to -- stop --

Signed and Sealed this

Seventh Day of March, 1989

Attest:

DONALD J. QUIGG

Attesting Officer

Commissioner of Patents and Trademarks